United States Patent
Jo et al.

(10) Patent No.: US 10,855,176 B1
(45) Date of Patent: Dec. 1, 2020

(54) NEGATIVE VOLTAGE GENERATION CIRCUIT WITHOUT LOW-DROPOUT REGULATOR

(71) Applicant: SAMSUNG ELECTRO-MECHANICS CO., LTD., Suwon-si (KR)

(72) Inventors: Byeong Hak Jo, Suwon-si (KR); Hyun Paek, Suwon-si (KR); Jeong Hoon Kim, Suwon-si (KR); Sol A Kim, Suwon-si (KR); Jong Mo Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/536,601

(22) Filed: Aug. 9, 2019

(30) Foreign Application Priority Data

May 15, 2019 (KR) .......................... 10-2019-0057119

(51) Int. Cl.
*H02M 3/07* (2006.01)

(52) U.S. Cl.
CPC ........ *H02M 3/07* (2013.01); *H02M 2003/071* (2013.01)

(58) Field of Classification Search
CPC ............ H02M 3/02; H02M 3/04; H02M 3/06; H02M 3/07; H02M 2003/071
See application file for complete search history.

(56) References Cited

U.S. PATENT DOCUMENTS

| | | | |
|---|---|---|---|
| 6,229,379 B1 | 5/2001 | Okamoto | |
| 2009/0174441 A1* | 7/2009 | Gebara | H02M 3/073 327/115 |
| 2013/0177175 A1* | 7/2013 | Ting | H03G 1/0094 381/120 |
| 2014/0049294 A1* | 2/2014 | Yanagidaira | H03K 19/0005 327/108 |
| 2018/0250505 A1* | 9/2018 | Schrock | A61N 1/37211 |

FOREIGN PATENT DOCUMENTS

JP 11-150230 A 6/1999

* cited by examiner

*Primary Examiner* — Diana J. Cheng
(74) *Attorney, Agent, or Firm* — NSIP Law

(57) ABSTRACT

A negative voltage generation circuit includes a clock generation circuit configured to generate a first clock signal, a first voltage control circuit configured to vary a first resistance value based on a magnitude of a power supply voltage and further configured to control a magnitude of a voltage in a first charge node, based on the varied first resistance value, and a first charge pump circuit configured to charge a voltage, controlled by the first voltage control circuit, in a charge mode, based on the first clock signal, and further configured to output a first voltage, generated by the charging, as a first negative voltage.

23 Claims, 8 Drawing Sheets

NEGATIVE VOLTAGE GENERATION CIRCUIT WITHOUT LOW-DROPOUT REGULATOR

CROSS-REFERENCE TO RELATED APPLICATION(S)

This application claims the benefit under 35 U.S.C. 119(a) of Korean Patent Application No. 10-2019-0057119 filed on May 15, 2019 in the Korean Intellectual Property Office, the entire disclosure of which is incorporated herein by reference for all purposes.

BACKGROUND

1. Field

The present disclosure relates to a negative voltage generation circuit without a low-dropout (LDO) regulator.

2. Description of Related Art

Typically, a power amplifier module (PAM) may include a plurality of switches, a filter, and a power amplifier (PA) to support various frequency bands. For example, a signal, amplified by a PA, may be transmitted to an antenna through a band selection switch (BSSW), a filter, and an antenna switch module (ASM).

The band selection switch (BSSW) and the antenna switch module (ASM) may include a radio-frequency (RF) switch to select a desired band.

Typically, an RF switch may use a negative voltage VNEG (for example, −VDD) to significantly reduce an effect caused by an OFF-state path other than an ON-state path among a plurality of paths. For example, the negative voltage VNEG is applied to a gate and a body of a switch transistor, disposed on the OFF-state path, in the RF Switch to improve switch characteristics. Accordingly, a negative voltage generator, configured to generate a negative voltage VNEG, may be needed to use the negative voltage VNEG.

As an example, a typical negative voltage generator may include a band gap reference (BGR) circuit generating a reference voltage, a low-dropout (LDO) regulator receiving a VBAT (3V to 5V) voltage and a reference voltage to generate a stable voltage (VLDO) (for example, 2.5V), an oscillator (OSC) generating a clock, and a charge pump (CP) performing charging and discharging of a capacitor using a clock to generate a negative voltage (−VLDO) (for example, −2.5V), in order to generate a negative voltage.

The negative voltage (VNEG) may affect harmonic performance and breakdown of a switch. For example, when the negative voltage (VNEG) is too low, a Field Effect Transistor (FET), used in the switch, may be broken down. When the negative voltage (VNEG) is too high, the FET may not enter an OFF state. In this case, a leakage current may be generated to deteriorate insertion loss performance.

Therefore, the negative voltage (VNEG) should be within a predetermined range, desired by a designer, irrespective of variations in battery voltage (VBAT) (3V to 5V). As an example, when the battery voltage (VBAT) (3V to 5V) is used directly as an input voltage of a charge pump, a negative voltage (VNEG) of −5V to −3V may be generated. Since the negative voltage (VNEG) of −5V to −3V is outside of the desired range, the input voltage is constantly maintained using a BGR circuit and an LDO regulator.

In such a typical negative voltage generator, physical sizes of an oscillator (OSC) and a charge pump (CP) may be designed to be small. However, since a BGR circuit and an LDO regulator occupy a relatively large area, they may hinder the miniaturization of the negative voltage generator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a negative voltage generation circuit includes a clock generation circuit configured to generate a first clock signal, a first voltage control circuit configured to vary a first resistance value based on a magnitude of a power supply voltage, and further configured to control a magnitude of a voltage in a first charge node, based on the varied first resistance value; and a first charge pump circuit configured to charge a voltage, controlled by the first voltage control circuit, in a charge mode, based on the first clock signal, and further configured to output a first voltage, generated by the charging, as a first negative voltage.

The first voltage control circuit may include a first detection circuit configured to detect the magnitude of the power supply voltage and output a first detection voltage; and a first voltage regulation circuit configured to vary the first resistance value based on the first detection voltage, and further configured to regulate the magnitude of the voltage at the first charge node, based on the varied first resistance value.

An output circuit may be connected between an output terminal of the first charge pump circuit and a ground, wherein the output circuit may be configured to stabilize the first negative voltage.

The first detection circuit may include a first resistor and a second resistor, connected in series between a terminal of the power supply voltage and a ground, and the first detection circuit may be configured to output a first detection voltage at a first connection node between the first resistor and the second resistor.

The first voltage regulation circuit may include a first fixed resistance circuit and a first switch connected in series between the terminal of the power supply voltage and the first charge node; and a first variable resistance circuit connected between the first charge node and a ground, wherein the first variable resistance circuit may be configured to have a first resistance value that varies based on a magnitude of the first detection circuit.

The first voltage regulation circuit may include a first variable resistance circuit and a first switch connected in series between the terminal of the power supply voltage and the first charge node; and a first fixed resistance circuit connected between the first charge node and a ground, and wherein the first variable resistance circuit may be configured to have a first resistance value that varies based on a magnitude of the first detection circuit.

The first charge pump circuit may include the first switch connected between the first fixed resistance circuit and the first charge node, a first capacitor connected between the first charge node and a first output node, a second switch connected between the first output node and a ground, a third switch connected between the first output node and an output terminal, and a fourth switch connected between the first charge node and a ground, wherein in the charge mode, the first switch and the second switch are configured to enter an ON state, and the third switch and the fourth switch are configured to enter an OFF state in response to the first clock signal, and wherein in a discharge mode, the first switch and the second switch may be configured to be in an OFF state, and the third switch and the fourth switch may be configured to be in an ON state in response to the first clock signal.

The first charge pump circuit may include the first switch connected between the first variable resistance circuit and the first charge node, a first capacitor connected between the first charge node and a first output node, a second switch connected between the first output node and a ground, a third switch connected between the first output node and an output terminal, and a fourth switch connected between the first charge node and a ground, wherein in the charge mode, the first switch and the second switch may be configured to be in an ON state, and the third switch and the fourth switch may be configured to enter an OFF state in response to the first clock signal, and wherein in a discharge mode, the first switch and the second switch may be configured to enter an OFF state, and the third switch and the fourth switch may be configured to enter an ON state in response to the first clock signal.

In a general aspect, a negative voltage generation circuit includes a clock generation circuit comprising a first clock signal and a second clock signal that have phases opposite to each other, a first voltage control circuit configured to vary a first resistance value based on a magnitude of a power supply voltage, and further configured to control a magnitude of a voltage in a first discharge node, based on the varied first resistance value, a second voltage control circuit configured to vary a second resistance value based on a magnitude of the power supply voltage and to control a magnitude of a voltage in a second charge node, based on the varied second resistance value, a first charge pump circuit configured to charge a voltage, controlled by the first voltage control circuit, in a charge mode, based on the first clock signal, and further configured to output a first voltage, generated by the charging, as a first negative voltage in a discharge mode, based on the first clock signal, and a second discharge pump circuit configured to charge a voltage, controlled by the second voltage control circuit, in a charge mode based on the second clock signal and further configured to output a second voltage, generated by the charging, as a second negative voltage in the discharge mode based on the second clock signal.

The first voltage control circuit may include a first detection circuit configured to detect a magnitude of a power supply voltage to output a first detection voltage; and a first voltage regulation circuit configured to vary a first resistance value based on the first detection voltage and further configured to regulate the magnitude of the voltage at the first charge node, based on the varied first resistance value.

The second voltage control circuit may include a second detection circuit configured to detect the magnitude of the power supply voltage and output a second detection circuit; and a second voltage regulation circuit configured to vary a second resistance value based on the second detection voltage to stably regulate the magnitude of the voltage at the second charge node based on the varied second resistance value.

The negative voltage generation circuit may include an output circuit connected between an output terminal, to which an output node of the first charge pump circuit and an output node of the second charge pump circuit are connected, and a ground to stabilize the first negative voltage and the second negative voltage.

The first detection circuit may include a first resistor and a second resistor connected in series between the terminal of the power supply voltage and a ground, and the first detection circuit may be configured to output the first detection voltage at a first connection node between the first resistor and the second resistor.

The second detection circuit may include a third resistor and a fourth resistor connected in series between the terminal of the power supply voltage and a ground, and the second detection circuit may be configured to output the second detection voltage at a second connection node between the third resistor and the fourth resistor.

The first voltage regulation circuit may include a first fixed resistance circuit and a first switch connected in series between the terminal of the power supply voltage and the first charge node; and a first variable resistance circuit connected between the first charge node and a ground, and the first variable resistance circuit is configured to have a first resistance value that varies based on a magnitude of the first detection voltage.

The first voltage regulation circuit may include a first variable resistance circuit and a first switch connected in series between the terminal of the power supply voltage and the first charge node; and a first fixed resistance circuit connected between the first charge node and a ground, and the first variable resistance circuit is configured to have a first resistance value that varies based on a magnitude of the first detection voltage.

The first charge pump circuit may include the first switch connected between the first fixed resistance circuit and the first charge node, a first capacitor connected between the first charge node and a first output node, a second switch connected between the first output node and a ground, a third switch connected between the first output node and an output terminal, a fourth switch connected between the first charge node and a ground, wherein in the charge mode, the first switch and the second switch may be configured to enter an ON state, and the third switch and the fourth switch may be configured to be in an OFF state in response to the first clock signal, and wherein in the discharge mode, the first switch and the second switch are configured to be in an OFF state and the third switch and the fourth switch are configured to enter an ON state in response to the first clock signal.

The first charge pump circuit may include the first switch connected between the first variable resistance circuit and the first charge node, a first capacitor connected between the first charge node and a first output node, a second switch connected between the first output node and a ground, a third switch connected between the first output node and an output terminal, and a fourth switch connected between the first charge node and a ground, wherein in the charge mode, the first switch and the second switch are configured to be in an ON state, and the third switch and the fourth switch are configured to be in an OFF state in response to the first clock signal, and wherein in the discharge mode, the first switch and the second switch are configured to be in an OFF state, and the third switch and the fourth switch are configured to be in an ON state in response to the first clock signal.

The second voltage regulation circuit may include a second fixed resistance circuit and a fifth switch connected between the terminal of the power supply voltage and the second charge node; and a second variable resistance circuit connected between the second charge node and a ground, and the second variable resistance circuit is configured to have a second resistance value that varies based on a magnitude of the second detection voltage.

The second voltage regulation circuit may include a second variable resistance circuit and a fifth switch connected between the terminal of the power supply voltage and the second charge node; and a second fixed resistance circuit connected between the second charge node and a ground, and the second variable resistance circuit is configured to have a second resistance value that varies based on a magnitude of the second detection voltage.

The second charge pump circuit may include a fifth switch connected between the second fixed resistance circuit and the second charge node, a second capacitor connected between the second charge node and a second output node, a sixth switch connected between the second output node and a ground, a seventh switch connected between the second output node and an output terminal; and an eighth switch connected between the second charge node and a ground, wherein in the charge mode, the fifth switch and the sixth switch may be configured to be in an ON state, and the seventh switch and the eighth switch are configured to be in an OFF state in response to the second clock signal, and wherein in the discharge mode, the fifth switch and the sixth switch may be configured to be in an OFF state, and the seventh switch and the eighth switch are configured to be in an ON state in response to the second clock signal.

The second charge pump circuit may include the fifth switch connected between the second variable resistance circuit and the second charge node, a second capacitor connected between the second charge node and a second output node, a sixth switch connected between the second output node and a ground, a seventh switch connected between the second output node and an output terminal; and an eighth switch connected between the second charge node and a ground, wherein in the charge mode, the fifth switch and the sixth switch are configured to be in an ON state, and the seventh switch and the eighth switch are configured to be in an OFF state in response the second clock signal, and wherein in the discharge mode, the fifth switch and the sixth switch are configured to be in an OFF state, and the seventh switch and the eighth switch are configured to be in an ON state in response to the second clock signal.

In a general aspect, a negative voltage generation circuit includes a clock generation circuit configured to generate a clock signal, a voltage control circuit configured to vary a resistance value of the negative voltage generation circuit based on a magnitude of a battery voltage, and a charge pump circuit configured to charge a voltage controlled by the voltage control circuit in a charging mode based on the clock signal and output a negative voltage in a discharging mode based on the clock signal.

Other features and aspects will be apparent from the following detailed description, the drawings, and the claims.

Figure 1:
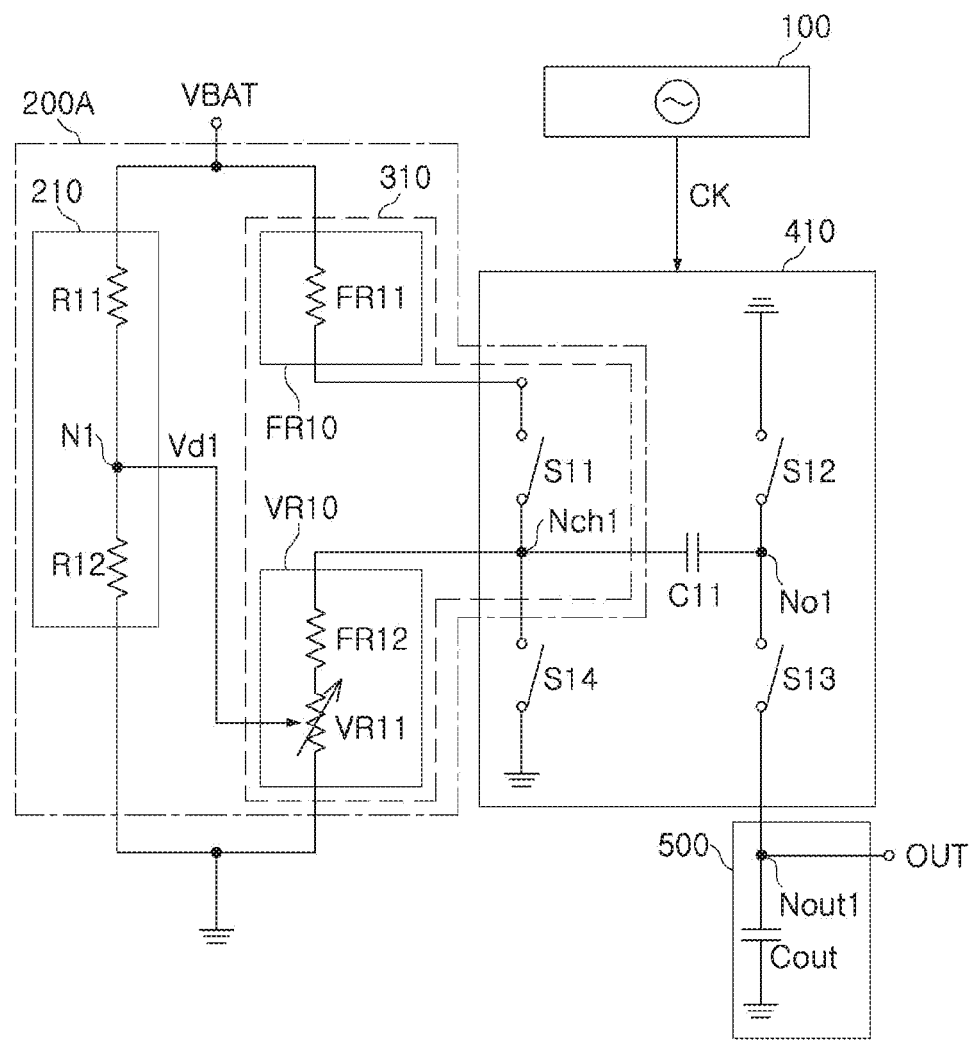
FIG. 1 illustrates an example of a circuit diagram of a negative voltage generation circuit in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Figure 2:
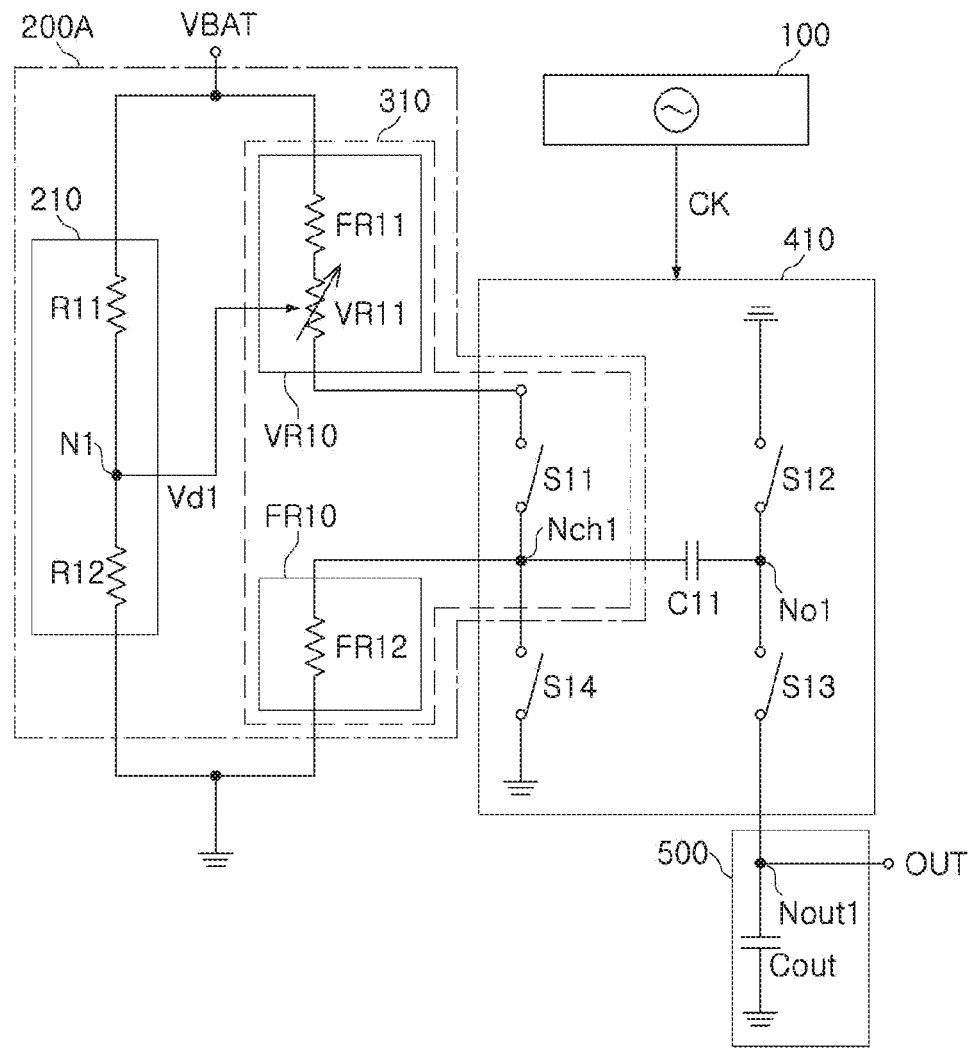
FIG. 2 illustrates an example of a circuit diagram of a negative voltage generation circuit in accordance with one or more embodiments.

FIG. 1 illustrates an example of a circuit diagram of a negative voltage generation circuit in accordance with one or more embodiments, and FIG. 2 illustrates an example of a circuit diagram of a negative voltage generation circuit in accordance with one or more embodiments.

Referring to FIGS. 1 and 2, a clock generation circuit 100, a first voltage generation circuit 200A, a first charge pump circuit 410, and an output circuit 500 may be further included in the negative voltage generation circuit.

The clock generation circuit 100 may generate a first clock signal CK in which a high level and a low level may be repeated in a constant cycle. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The first voltage control circuit 200A may vary a first resistance value based on a magnitude of a power supply voltage or battery voltage VBAT, and may control a magnitude of a voltage in a first charge node Nch1 based on the varied first resistance value. For example, the power supply voltage VBAT may be battery voltage. In general, the battery voltage may fluctuate (for example, fluctuate within a voltage range from 3V to 5V).

The first charge pump circuit 410 may charge a voltage, controlled by the first voltage control circuit 200A, in a charging mode depending on the first clock signal CK and may output a first voltage, generated by the charging, as a first negative voltage VNEG1 in a discharging mode depending on the first clock signal CK.

The output circuit 500 may be connected between an output of the first charge pump circuit 410 and a ground to stabilize the first negative voltage VNEG1.

For example, the first voltage control circuit 200A may include a first detection circuit 210 and a first voltage regulation circuit 310.

The first detection circuit 210 may detect the magnitude of the power supply voltage VBAT to output a first detection voltage Vd1.

The first voltage regulation circuit 310 may vary a first resistance value based on the first detection voltage Vd1 and may regulate the magnitude of the voltage in the first charge node Nch1 based on the varied first resistance value.

As an example, the first detection circuit 210 may include a first resistor R11 and a second resistor R12, connected in series between a terminal of the power supply voltage VBAT and a ground, and may supply the first detection voltage Vd1 in a first connection node N1 between the first and second resistors R11 and R12.

As an example, referring to FIG. 1, the first voltage regulation circuit 310 may include a first fixed resistance circuit FR10, a first switch S11, and a first variable resistance circuit VR10. The first fixed resistance circuit FR10 and the first switch S11 may be connected in series between a terminal of the power supply voltage VBAT and the first charge node Nch1. The first variable resistance circuit VR10 may be connected between the first charge node Nch1 and a ground, and may have a first resistance value that varies depending on the magnitude of the first detection voltage Vd1.

As an example, the first fixed resist circuit FR10 may include at least one first fixed resistor FR11. The first variable resistance circuit VR10 may include at least one second fixed resistor FR12 and at least one first variable resistor VR11.

As an example, referring to FIG. 2, the first voltage regulation circuit 310 may include a first variable resistance circuit VR10, a first switch S11, and a first fixed resistance circuit FR10. The first variable resistance circuit VR10 and the first switch S11 may be connected in series between the terminal of the power supply voltage VBAT and the first charge node Nch1. The first fixed resistance circuit FR10 may be connected between the first charge node Nch1 and a ground. The first variable resistance circuit VR10 may have a first resistance value that may vary depending on the magnitude of the first detection voltage Vd1.

As an example, the first variable resistance circuit VR10 may further include at least one first fixed resistor FR11, and at least one first variable resistance element VR11. The first fixed resistance circuit FR10 may include at least one second fixed resistor FR12.

Referring to FIGS. 1 and 2, for example, the first charge pump circuit 410 may include a first capacitor C11, a first switch S11, a second switch S12, a third switch S13, and a fourth switch S14.

The first switch S11 may be connected between the first fixed resistance circuit FR10 and the first charge node Nch1, as illustrated in FIG. 1. Alternatively, the first switch S11 may be connected between the first variable resistance circuit VR10 and the first charge node Nch1, as illustrated in FIG. 2.

The first capacitor C11 may be connected between the first charge node Nch1 and a first output node No1. The second switch S12 may be connected between the first output node No1 and a ground. The third switch S13 may be connected between the first output node No1 and an output terminal OUT. The fourth switch S14 may be connected between the first charge node Nch1 and a ground.

In such an example, an operation example is as follows. In the charge mode, the first and second switches S11 and S12 may enter an ON state and the third and fourth switches S13 and S14 may enter an OFF state in response to the first clock signal CK of the clock generation circuit 100. In the discharge mode, the first and second switches S11 and S12 may enter an OFF state and the third and fourth switches S13 and S14 may enter an ON state in response to the first clock signal CK of the clock generation circuit 100.

In the respective drawings of the present disclosure, unnecessary overlapped descriptions are possibly omitted for components having the same reference numeral and the same function, and only differences therebetween will be described.

Figure 3:
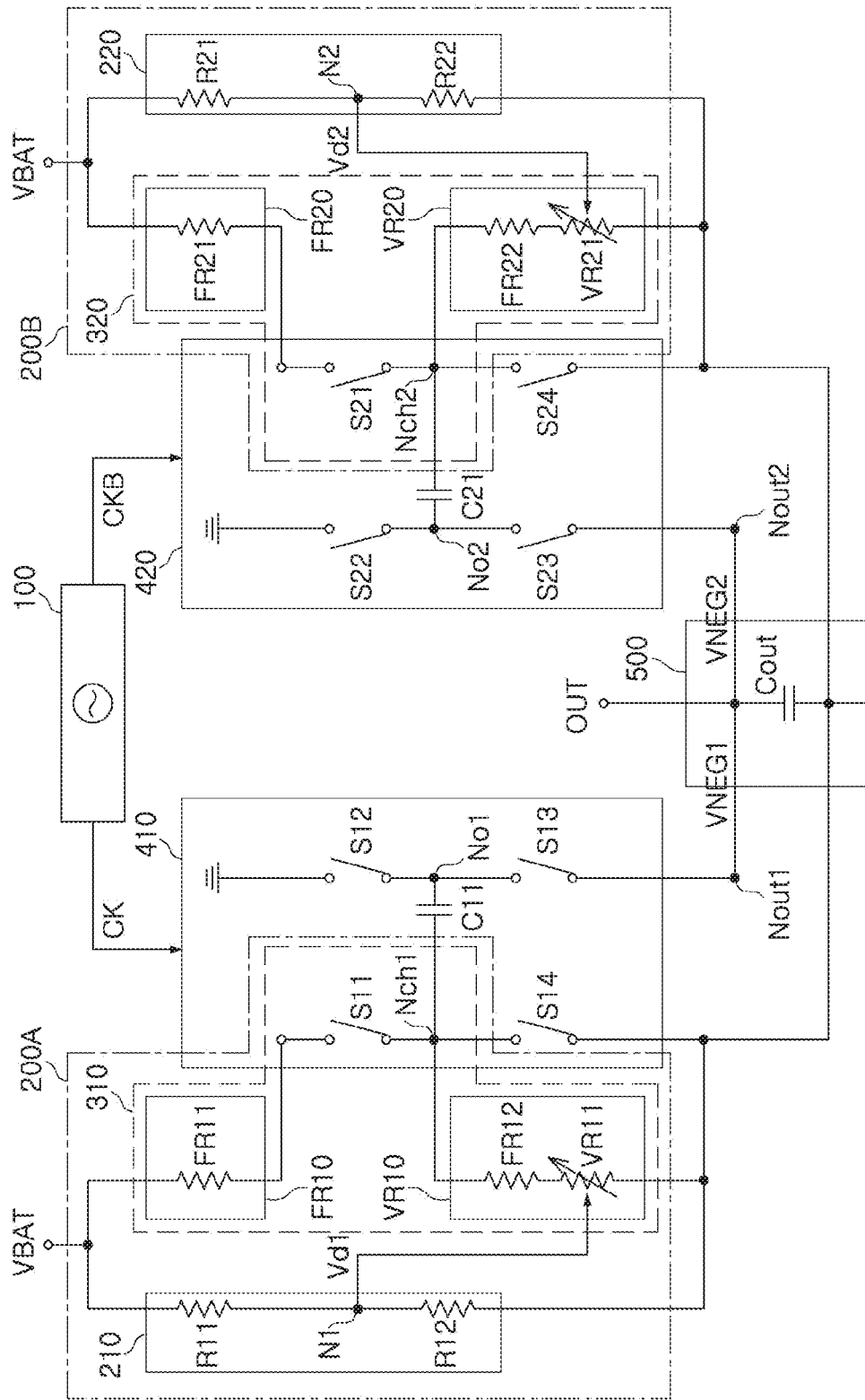
FIG. 3 illustrates an example of a circuit diagram of a negative voltage generation circuit having a dual structure in accordance with one or more embodiments.
Figure 4:
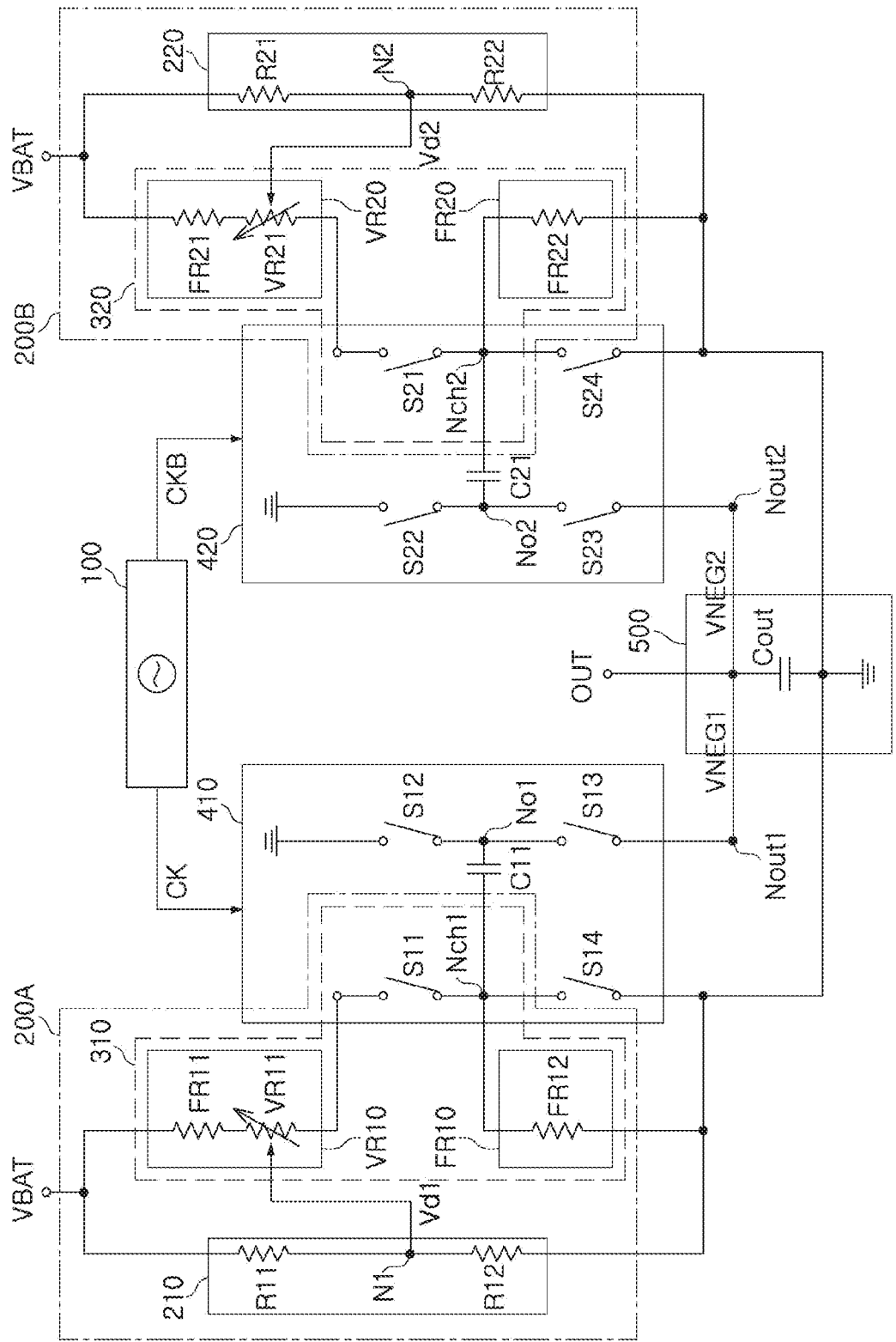
FIG. 4 illustrates an example of a circuit diagram of a negative voltage generation circuit having a dual structure in accordance with one or more embodiments.

FIG. 3 illustrates an example of a circuit diagram of a negative voltage generation circuit having a dual structure, and FIG. 4 illustrates an example of a circuit diagram of a negative voltage generation circuit having a dual structure.

Referring to FIGS. 3 and 4, a negative voltage generation circuit having a dual structure according to an example may include a clock generation circuit 100, a first voltage control circuit 200A, a second voltage control circuit 200B, a first charge pump circuit 410, a second discharge pump circuit 420, and an output circuit 500.

The clock generation circuit 100 may generate first and second clock signals CK and CKB. The first clock signal CK may be a signal in which a high level and a low level are repeated in a constant cycle, and the second clock signal CKB is a signal having a phase opposite to a phase of the first clock signal CK.

The first voltage control circuit 200A may vary a first resistance value based on a magnitude of a power supply voltage VBAT and may control a magnitude of a voltage in the first charge node Nch1 based on the varied first resistance value.

The second voltage control circuit 200B may vary a second resistance value based on the magnitude of the power supply voltage VBAT, and may control a magnitude of a voltage in a second charge node Nch2, based on the varied second resistance value.

The first charge pump circuit 410 may charge a voltage, controlled by the first voltage control circuit 200A, in a charge node depending on the first clock signal CK and may output a first voltage, generated by the charging, as a first negative voltage VNEG1 in a discharge mode depending on the clock signals CK and CKB.

The second charge pump circuit 420 may charge a voltage, generated by the second voltage control circuit 200B, in a charge mode depending on the second clock signal CKB and output a second voltage, generated by the charging, as a second negative voltage VNEG2 in a discharge mode depending on the clock signals CK and CKB.

The output circuit 500 may be connected between an output node Nout1 of the first charge pump circuit 410 and an output node Nout2 of the second charge pump circuit 420 to stabilize the first negative voltage VNEG1 and the second negative voltage VNEG2. Although the output node Nout1 of the first charge pump circuit 410, the output node Nout2 of the second charge pump circuit 420, and the output terminal OUT have been distinguished for ease of description, they may be substantially the same node in a circuit.

For example, the first voltage control circuit 200A may include a first detection circuit 210 and a first voltage regulation circuit 310.

The first detection circuit 210 may detect a magnitude of a power supply voltage VBAT to output a first detection voltage Vd1. The first voltage regulation circuit 310 may vary a first resistance value based on the first detection voltage Vd1 to stably regulate a magnitude of a voltage in the first charge node Nch1 based on the varied first resistance value.

In addition, the second voltage control circuit 200B may include a second detection circuit 220 and a second voltage regulation circuit 320.

The second detection circuit 220 may detect the magnitude of the power supply voltage VBAT to output a second detection voltage Vd2. The second voltage regulation circuit 320 may vary a second resistance value based on the second detection voltage Vd2 to stably regulate a magnitude of a voltage at the second charge node Nch2 based on the varied second resistance value.

For example, the first detection circuit 210 may include a first resistor R11 and a second resistor R12 connected in series between a terminal of the power supply voltage VBAT and a ground, and may provide the first detection voltage Vd1 in a first connection node N1 between the first and second resistors R11 and R12. The first voltage regulation circuit 310 may vary a first resistance value between the first charge node Nch1 and a ground based on a magnitude of the detected voltage, and may stably regulate a magnitude of a voltage between the first charge node Nch1 and a ground based on the varied first resistance value.

For example, the second detection circuit 220 may include a third resistor R21 and a fourth resistor R22 connected in series between the terminal of the power supply voltage VBAT and a ground, and may provide the second detection voltage Vd2 at a second connection mode N2 between the third and fourth resistors R21 and R22. The second voltage regulation circuit 320 may vary a second resistance value between the second charge node Nch2 and the ground based on the magnitude of the detected voltage to stably regulate a magnitude of a voltage between the second charge node Nch2 and the ground based on the varied second resistance value.

Referring to FIG. 3, the first voltage regulation circuit 310 may include a first fixed resistance circuit FR10, a first switch S11, and a first variable resistance circuit VR10.

The first fixed resistance circuit FR10 and the first switch S11 may be connected in series between a terminal of the power supply voltage VBAT and the first charge node Nch1. The first variable resistance circuit VR10 may be connected between the first charge node Nch1 and a ground, and may have a first resistance value that varies depending on the magnitude of the first detection voltage Vd1.

For example, when the power supply voltage VBAT is increased, a first resistance value of the first variable resistance circuit VR10 is decreased to allow a voltage between the first charge node Nch1 and a ground to be stably maintained even if the power supply voltage VBAT is increased. As the voltage in the first charge node Nch1, a charge voltage, is maintained at a constant level, the voltage at the output node No1, a discharge voltage, may also be maintained at a constant level.

The second voltage regulation circuit 320 may include a second fixed resistance circuit FR20, a fifth switch S21, and a second variable resistance circuit VR20. The second fixed resistance circuit FR20 and the fifth switch S21 may be connected in series between the terminal of the power supply voltage VBAT and the second charge node Nch2. The second variable resistance circuit VR20 may be connected between the second charge node Nch2 and a ground, and may have a second resistance value that varies depending on a magnitude of the second detection voltage Vd2.

As an example, the second fixed resistance circuit FR20 may include at least one third fixed resistor FR21. The second variable resistance circuit VR20 may include at least one fourth fixed resistor FR22 and at least one second variable resistance element VR21.

Referring to FIG. 4, the first voltage regulation circuit 310 may include a first variable resistance circuit VR10, a first switch S11, and a first fixed resistance circuit FR10.

The first variable resistance circuit VR10 and the first switch S11 may be connected in series between a terminal of the power supply voltage VBAT and the first charge node Nch1. The first fixed resistance circuit FR10 may be connected between the first charge node Nch1 and a ground. The first variable resistance circuit VR10 may have a first resistance value that varies depending on a magnitude of the first detection voltage Vd1.

For example, when the power supply voltage VBAT is increased, the first resistance value of the first variable resistance circuit VR10 may be increased to allow a voltage between the first charge node Nch1 and the ground to be maintained at a constant level even if the power supply voltage VBAT is increased. As the voltage in the first charge node Nch1, a charge voltage, is maintained at a constant level, the voltage at the first output node No1, a discharge voltage, may be maintained at a constant level.

The second voltage regulation circuit 320 may include a second variable resistance circuit VR20, a fifth switch S21, and a second fixed resistance circuit FR20. The second variable resistance circuit VR20 and the fifth switch S21 may be connected in series between the terminal of the power supply voltage VBAT and the second charge node Nch2. The second fixed resistance circuit FR20 may be connected between the second charge node Nch2 and a ground. The second variable resistance circuit VR20 may have a second resistance value that varies depending on a magnitude of the second detection voltage Vd2.

For example, when the power supply voltage VBAT is increased, the second resistance value of the second variable resistance circuit VR20 may be increased to allow the voltage between the second charge Nch2 and the ground to be maintained at a constant level, even if the power supply voltage VBAT is increased. As the voltage at the second charge node Nch2, a charge voltage, is maintained at a constant level, the voltage at the second output node No2, a discharge voltage, may also be maintained at a constant level.

As an example, the second variable resistance circuit VR20 may include at least one third fixed resistor FR21 and at least one second variable resistance element VR21. The second fixed resistance circuit FR20 may include at least one fourth fixed resistor FR22.

Referring to FIGS. 3 and 4, for example, the first charge pump circuit 410 may include a first capacitor C11, a first switch S11, a second switch S12, a third switch S13, and a forth switch S14.

The first switch S11 may be connected between the first fixed resistance circuit FR10 and the first charge node Nch1, as illustrated in FIG. 3. Alternatively, the first switch S11 may be connected between the first variable resistance circuit VR10 and the first charge node Nch1, as illustrated in FIG. 4.

The first capacitor C11 may be connected between the first charge node Nch1 and the first output node No1. The second switch S12 may be connected between the first output node No1 and a ground. The third switch S13 may be connected between the first output node No1 and the output terminal OUT. The fourth switch S14 may be connected between the first charge node Nch1 and a ground.

In such an example, an operation example is as follows. In the charge mode, the first and second switches S11 and S12 may enter an ON state and the third and fourth switches S13 and S14 may enter an OFF state in response to the first clock signal CK of the clock generation circuit 100. In the discharge mode, the first and second switches S11 and S12 may enter an OFF state and the third and fourth switches S13 and S14 may enter an ON state in response to the first clock signal CK of the clock generation circuit 100.

Referring to FIGS. 3 and 4, for example, the second charge pump circuit 420 may include a second capacitor C21, a fifth switch S21, a sixth switch S22, a seventh switch S23, and an eighth switch S24.

The fifth switch S21 may be connected between the second fixed resistance circuit FR20 and the second charge node Nch2, as illustrated in FIG. 3. Alternatively, the fifth switch S21 may be connected between the second variable resistance circuit VR20 and the second charge node Nch2, as illustrated in FIG. 4.

The second capacitor C21 may be connected between the second charge node Nch2 and a second output node No2, a sixth switch S22 may be connected between the second output node No2 and a ground, the seventh switch S23 may be connected between the second charge node No2 and the output terminal OUT, and the eighth switch S24 may be connected between the second charge node Nch2 and a ground.

In such an example, an operation example is as follows. In the charge mode, the fifth and sixth switches S21 and S22 may enter an ON state and the seventh and eighth switches S23 and S24 may enter an OFF state in response to the second clock signal CKB of the clock generation circuit 100. In the discharge mode, the fifth and sixth switches S21 and S22 may enter an OFF state and the seventh and eighth switches S23 and S24 may enter an ON state in response to the second clock signal CKB of the clock generation circuit 100.

Figure 5:
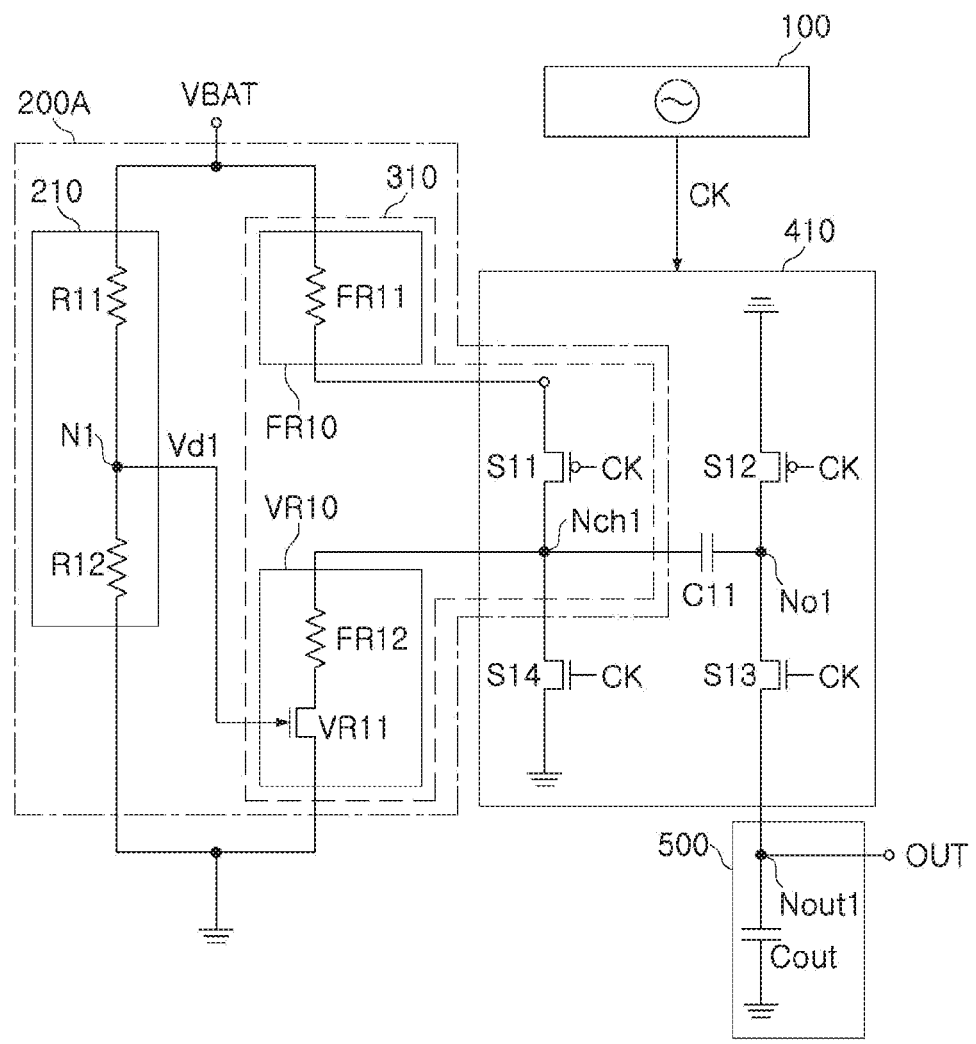
FIG. 5 is a circuit diagram illustrating an example of implementing a negative voltage generation circuit in accordance with one or more embodiments.

FIG. 5 is a circuit diagram illustrating an example of implementing a negative voltage generation circuit.

Referring to FIG. 5, for example, a first switch S11 and a second switch S12 of a first charge pump circuit 410 may be a P-channel field effect transistor (FET) and a third switch S13 and a fourth switch S14 thereof may be an N-channel FET, and vice versa. For example, in a charge mode, the first and second switches S11 and S12 may enter an ON state and the third and fourth switches S13 and S14 may enter an OFF state in response to the first clock signal CK of the clock generation circuit 100. In the discharge mode, the first and second switches S11 and S12 may enter an OFF state and the third and fourth switches S13 and S14 may enter an ON state in response to the first clock signal CK of the clock generation circuit 100.

As an example, a first variable resistance element VR11 of a first voltage regulation circuit 310 may be an FET, and the FET may provide a first resistance value, that may vary depending on a magnitude of a first detection voltage Vd1, in a first connection node N1 between first and second resistors R11 and R12.

For example, in FIG. 5, when the first and second switches S11 and S12 are in the ON state and a voltage drop of a switch element are disregarded, a voltage Vnch1 in a first charge node Nch1 may be obtained by Equation 1 below.

$$Vnch1=[(Rfr12+Rvar)/(Rfr12+Rvar+Rfr11)]*VBAT \quad \text{(Equation 1)}$$

where Rfr11 denotes a resistance value of a first fixed resistance circuit FR10, Rfr12 denotes a resistance value of a second fixed resistance circuit FR20, and Rvar denotes a first resistance value.

In Equation 1, the first resistance value Rvar may be an ON-resistance when a first variable resistance circuit VR10 includes a transistor, which may be expressed as Equation 2.

$$Rvar=1/[k*(Vgs-Vth)] \quad \text{(Equation 2)}$$

where Vgs denotes a first detection voltage, corresponding to a gate-source voltage of a transistor, Vth denotes a threshold voltage of the transistor, and k denotes a constant dependent on width W and length L of the transistor (proportional to W/L).

A first detection voltage Vd1 may be calculated as Equation 3.

$$Vd1=[(R12)/(R11+R12)]*VBAT \quad \text{(Equation 3)}$$

Referring to Equations 1 to 3, when a power supply voltage VBAT is increased, the first detection voltage Vd1 is increased in Equation 3. When the first detection voltage Vd1 (=Vgs) is increased by Equation 2, the first resistance value Rvar of the first variable resistance circuit VR10 is decreased. Since the first resistance value Rvar is decreased and the other resistances are fixed in Equation 1, [(Rfr12+Rvar)/(Rfr12+Rvar+Rfr11)] may be decreased to allow a voltage Vnch1 in a first charge node Nch1 to be maintained at a constant level even if the power supply voltage VBAT is increased. As the voltage in the first charge node Nch1, a charge voltage, is maintained at a constant level, the voltage at the first output node No1, a discharge voltage, may also be maintained at a constant level.

Figure 6:
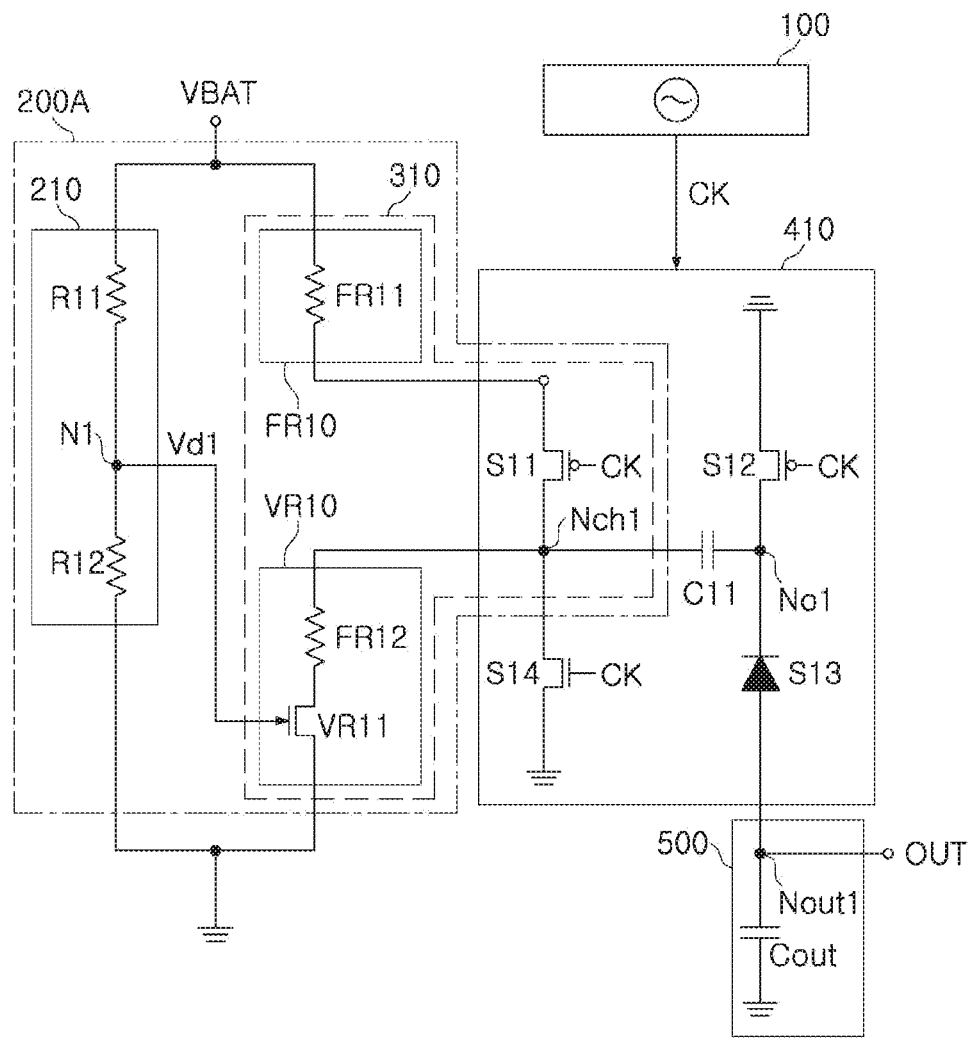
FIG. 6 is a circuit diagram illustrating an example of implementing a negative voltage generation circuit in accordance with one or more embodiments.

FIG. 6 is a circuit diagram illustrating an example of implementing a negative voltage generation circuit.

Referring to FIG. 6, for example, a first switch S11 and a second switch S12 of a first charge pump circuit 410 may be a P-channel field effect transistor (FET), a third switch S13 thereof may be an N-channel FET, and a fourth switch S14 thereof may be a switching diode. For example, in a charge mode, the first and second switches S11 and S12 may enter an ON state and the third and fourth switches S13 and S14 may enter an OFF state in response to the first clock signal CK of the clock generation circuit 100. In the discharge mode, the first and second switches S11 and S12 may enter an OFF state and the third and fourth switches S13 and S14 may enter an ON state in response to the first clock signal CK of the clock generation circuit 100.

As an example, a first variable resistance element VR11 of a first voltage regulation circuit 310 may be an FET, and the FET may provide a first resistance value, that may vary depending on a magnitude of a first detection circuit Vd1 in a first connection node N1 between first and second resistors R11 and R12.

Figure 7:
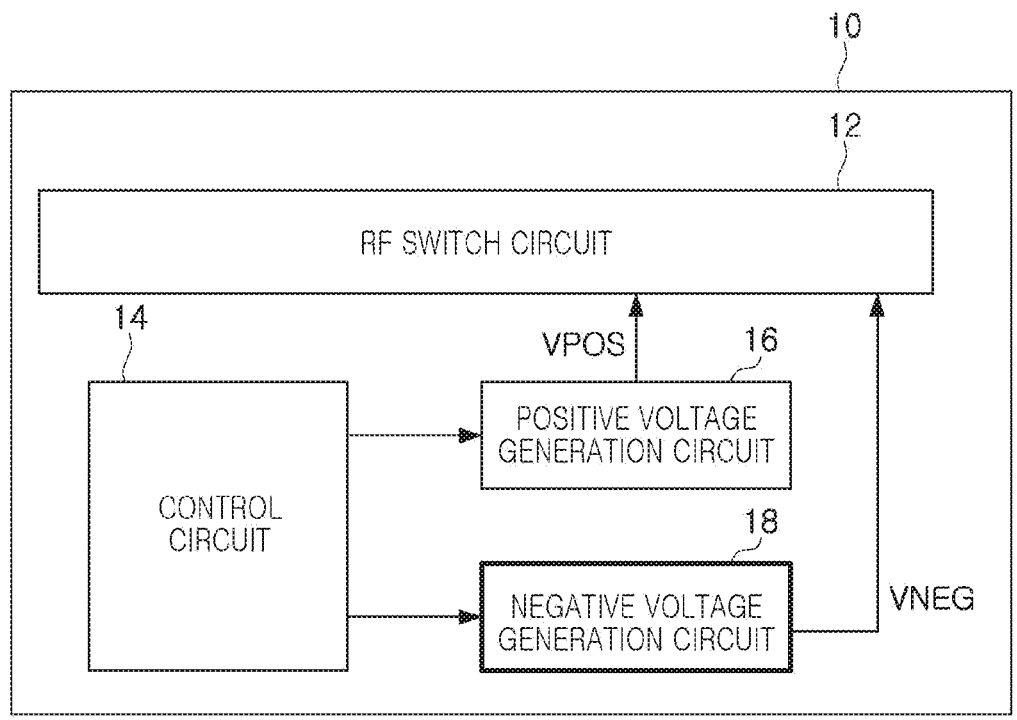
FIG. 7 is a block diagram illustrating an example of applying a negative voltage generation circuit in accordance with one or more embodiments.

FIG. 7 is a block diagram illustrating an example of applying a negative voltage generation circuit.

Referring to FIG. 7, a negative voltage generation circuit 18 according to an example may be applied to a radio-frequency (RF) switch device 10.

The RF switch device 10 may include an RF switch circuit 12 configured to switch an RF signal, a control circuit 14 configured to control supply of a positive voltage VPOS and a negative voltage VNEG, a positive voltage generation circuit 16 configured to generate the positive voltage VPOS, and a negative voltage generation circuit 18 according to the example.

FIG. 7 illustrates an example to which the negative voltage generation circuit 18 is applied, but the examples are not limited thereto.

Figure 8:
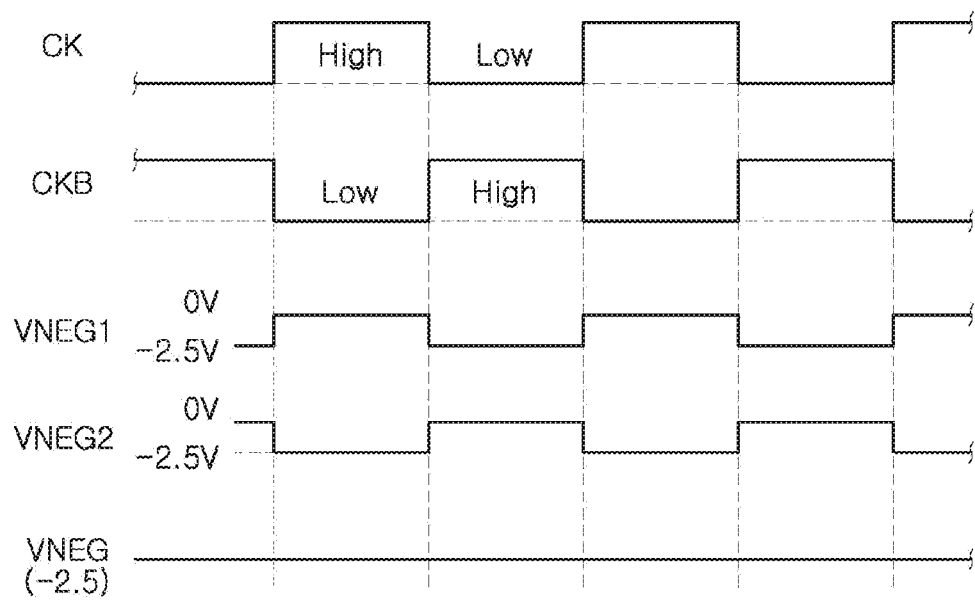
FIG. 8 illustrates examples of waveforms of a first clock signal, a second clock signal, a first negative voltage, a second negative voltage, and a negative voltage in accordance with one or more embodiments.

FIG. 8 illustrates examples of waveforms of a first clock signal (CK), a second clock signal (CKB), a first negative voltage (VNEG1), a second negative voltage (VNEG2), and a negative voltage (VNEG).

Referring to FIG. 8, CK denotes a first clock signal, in which a high level and a low level may be repeated in a constant cycle, and CKB denotes a second clock signal, having a phase opposite to a phase of the first clock signal CK, in which a high level and a low level may be repeated in a constant cycle. Also in FIG. 8, VNEG1 denotes a first negative voltage output from a first charge pump circuit 410 and synchronized with the first clock signal CK such that a magnitude of −2.5V and a magnitude of 0V transition to each other, VNEG2 denotes a second negative voltage output from a second charge pump circuit 420 and synchronized with the second clock signal CKB such that a magnitude of −2.5V and a magnitude of 0V transition to each other, and VNEG denotes a negative voltage maintained at about −2.5V because the first negative voltage VNEG1 and the second negative voltage VNEG2 are summed at an output terminal.

Figure 9:
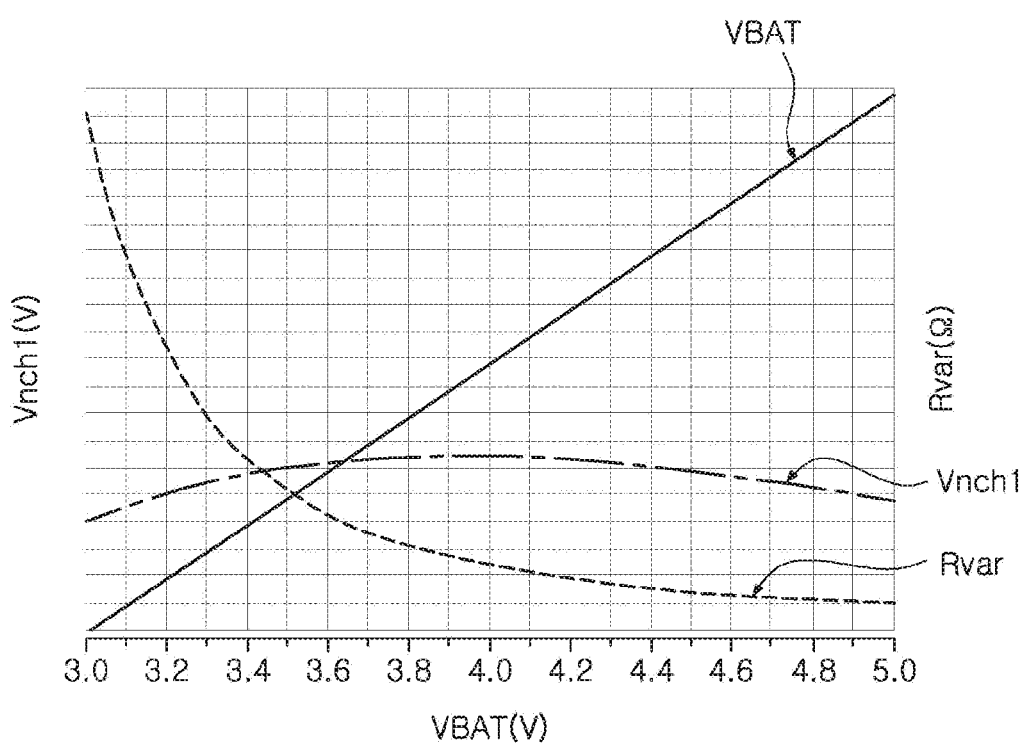
FIG. 9 is a graph illustrating examples of fluctuations in battery voltage (VBAT), a charge node voltage (Vnch1), and a variable resistance value (Rvar).

FIG. 9 is a graph illustrating variation in battery voltage VBAT, a charge node voltage Vnch1, and a variable resistance value Rvar.

Referring to FIG. 9, as the battery voltage VBAT increases from 3V to 5V, the variable resistance value RVar is gradually reduced. Accordingly, as can be seen from FIG. 9, a charge voltage node voltage Vnch1 has a constant magnitude between 2.9V and 3.1V.

As described above, according to an example, a voltage at a charge node of a charge pump, a charge voltage, may be constantly maintained without use of a BGR circuit and an LDO regulator, irrespective of fluctuations in battery voltage used as a power supply voltage. As the voltage at the charge node is maintained at a constant level, a voltage at an output node, a negative voltage, may also be maintained at a constant level to generate a constant negative voltage.

In addition, since the BGR circuit and the LDO regulator are not used, a chip size may be significantly reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A negative voltage generation circuit comprising:
a clock generation circuit configured to generate a first clock signal;
a first voltage control circuit configured to vary a first resistance value in proportion with a magnitude of a power supply voltage of the negative voltage generation circuit, and further configured to control a magnitude of a voltage in a first charge node, based on the varied first resistance value; and
a first charge pump circuit configured to charge a voltage, controlled by the first voltage control circuit, in a charge mode, based on the first clock signal, and further configured to output a first voltage, generated by the charging, as a first negative voltage.

2. The negative voltage generation circuit of claim 1, wherein the first voltage control circuit comprises:
a first detection circuit configured to detect the magnitude of the power supply voltage and output a first detection voltage; and
a first voltage regulation circuit configured to vary the first resistance value based on the first detection voltage, and further configured to regulate the magnitude of the voltage at the first charge node, based on the varied first resistance value.

3. The negative voltage generation circuit of claim 2, further comprising:

an output circuit connected between an output terminal of the first charge pump circuit and a ground, wherein the output circuit is configured to stabilize the first negative voltage.

4. The negative voltage generation circuit of claim 2, wherein the first detection circuit comprises a first resistor and a second resistor, connected in series between a terminal of the power supply voltage and a ground, and the first detection circuit is configured to output a first detection voltage at a first connection node between the first resistor and the second resistor.

5. The negative voltage generation circuit of claim 4, wherein the first voltage regulation circuit comprises:
a first fixed resistance circuit and a first switch connected in series between the terminal of the power supply voltage and the first charge node; and
a first variable resistance circuit connected between the first charge node and a ground;
wherein the first variable resistance circuit is configured to have a first resistance value that varies based on a magnitude of the first detection circuit.

6. The negative voltage generation circuit of claim 4, wherein the first voltage regulation circuit comprises:
a first variable resistance circuit and a first switch connected in series between the terminal of the power supply voltage and the first charge node; and
a first fixed resistance circuit connected between the first charge node and a ground,
wherein the first variable resistance circuit is configured to have a first resistance value that varies based on a magnitude of the first detection circuit.

7. The negative voltage generation circuit of claim 5, wherein the first charge pump circuit comprises:
the first switch connected between the first fixed resistance circuit and the first charge node;
a first capacitor connected between the first charge node and a first output node;
a second switch connected between the first output node and a ground;
a third switch connected between the first output node and an output terminal; and
a fourth switch connected between the first charge node and a ground,
wherein in the charge mode, the first switch and the second switch are configured to enter an ON state, and the third switch and the fourth switch are configured to enter an OFF state in response to the first clock signal, and
wherein in a discharge mode, the first switch and the second switch are configured to be in an OFF state, and the third switch and the fourth switch are configured to be in an ON state in response to the first clock signal.

8. The negative voltage generation circuit of claim 6, wherein the first charge pump circuit comprises:
the first switch connected between the first variable resistance circuit and the first charge node;
a first capacitor connected between the first charge node and a first output node;
a second switch connected between the first output node and a ground;
a third switch connected between the first output node and an output terminal; and
a fourth switch connected between the first charge node and a ground,
wherein in the charge mode, the first switch and the second switch are configured to be in an ON state, and the third switch and the fourth switch are configured to enter an OFF state in response to the first clock signal, and
wherein in a discharge mode, the first switch and the second switch are configured to enter an OFF state, and the third switch and the fourth switch are configured to enter an ON state in response to the first clock signal.

9. A negative voltage generation circuit comprising:
a clock generation circuit configured to output a first clock signal and a second clock signal that have phases opposite to each other;
a first voltage control circuit configured to vary a first resistance value in proportion with a magnitude of a power supply voltage of the negative voltage generation circuit, and further configured to control a magnitude of a voltage in a first discharge node, based on the varied first resistance value;
a second voltage control circuit configured to vary a second resistance value proportion with a magnitude of the power supply voltage of the negative voltage generation circuit, and to control a magnitude of a voltage in a second charge node, based on the varied second resistance value;
a first charge pump circuit configured to charge a voltage, controlled by the first voltage control circuit, in a charge mode, based on the first clock signal, and further configured to output a first voltage, generated by the charging, as a first negative voltage in a discharge mode, based on the first clock signal; and
a second discharge pump circuit configured to charge a voltage, controlled by the second voltage control circuit, in a charge mode based on the second clock signal and further configured to output a second voltage, generated by the charging, as a second negative voltage in the discharge mode based on the second clock signal.

10. The negative voltage generation circuit of claim 9, wherein the first voltage control circuit comprises:
a first detection circuit configured to detect a magnitude of a power supply voltage to output a first detection voltage; and
a first voltage regulation circuit configured to vary a first resistance value based on the first detection voltage and further configured to regulate the magnitude of the voltage at the first charge node, based on the varied first resistance value.

11. The negative voltage generation circuit of claim 10, wherein the second voltage control circuit comprises:
a second detection circuit configured to detect the magnitude of the power supply voltage and output a second detection circuit; and
a second voltage regulation circuit configured to vary a second resistance value based on the second detection voltage to stably regulate the magnitude of the voltage at the second charge node based on the varied second resistance value.

12. The negative voltage generation circuit of claim 9, further comprising:
an output circuit connected between an output terminal, to which an output node of the first charge pump circuit and an output node of the second charge pump circuit are connected, and a ground to stabilize the first negative voltage and the second negative voltage.

13. The negative voltage generation circuit of claim 11, wherein the first detection circuit comprises a first resistor and a second resistor connected in series between the terminal of the power supply voltage and a ground, and the first detection circuit is configured to output the first detection voltage at a first connection node between the first resistor and the second resistor.

14. The negative voltage generation circuit of claim 13, wherein the second detection circuit comprises a third resistor and a fourth resistor connected in series between the terminal of the power supply voltage and a ground, and the second detection circuit is configured to output the second detection voltage at a second connection node between the third resistor and the fourth resistor.

15. The negative voltage generation circuit of claim 14, wherein the first voltage regulation circuit comprises:
a first fixed resistance circuit and a first switch connected in series between the terminal of the power supply voltage and the first charge node; and
a first variable resistance circuit connected between the first charge node and a ground, and
the first variable resistance circuit is configured to have a first resistance value that varies based on a magnitude of the first detection voltage.

16. The negative voltage generation circuit of claim 14, wherein the first voltage regulation circuit comprises:
a first variable resistance circuit and a first switch connected in series between the terminal of the power supply voltage and the first charge node; and
a first fixed resistance circuit connected between the first charge node and a ground, and
the first variable resistance circuit is configured to have a first resistance value that varies based on a magnitude of the first detection voltage.

17. The negative voltage generation circuit of claim 15, wherein
the first charge pump circuit comprises:
the first switch connected between the first fixed resistance circuit and the first charge node;
a first capacitor connected between the first charge node and a first output node;
a second switch connected between the first output node and a ground;
a third switch connected between the first output node and an output terminal; and
a fourth switch connected between the first charge node and a ground,
wherein in the charge mode, the first switch and the second switch are configured to enter an ON state, and the third switch and the fourth switch are configured to be in an OFF state in response to the first clock signal, and
wherein in the discharge mode, the first switch and the second switch are configured to be in an OFF state and the third switch and the fourth switch are configured to enter an ON state in response to the first clock signal.

18. The negative voltage generation circuit of claim 16, wherein the first charge pump circuit comprises:
the first switch connected between the first variable resistance circuit and the first charge node;
a first capacitor connected between the first charge node and a first output node;
a second switch connected between the first output node and a ground;
a third switch connected between the first output node and an output terminal; and
a fourth switch connected between the first charge node and a ground,
wherein in the charge mode, the first switch and the second switch are configured to be in an ON state, and the third switch and the fourth switch are configured to be in an OFF state in response to the first clock signal, and
wherein in the discharge mode, the first switch and the second switch are configured to be in an OFF state, and the third switch and the fourth switch are configured to be in an ON state in response to the first clock signal.

19. The negative voltage generation circuit of claim 14, wherein the second voltage regulation circuit comprises:
a second fixed resistance circuit and a fifth switch connected between the terminal of the power supply voltage and the second charge node; and
a second variable resistance circuit connected between the second charge node and a ground, and
the second variable resistance circuit is configured to have a second resistance value that varies based on a magnitude of the second detection voltage.

20. The negative voltage generation circuit of claim 14, wherein the second voltage regulation circuit comprises:
a second variable resistance circuit and a fifth switch connected between the terminal of the power supply voltage and the second charge node; and
a second fixed resistance circuit connected between the second charge node and a ground, and
the second variable resistance circuit is configured to have a second resistance value that varies based on a magnitude of the second detection voltage.

21. The negative voltage generation circuit of claim 19, wherein the second charge pump circuit comprises:
a fifth switch connected between the second fixed resistance circuit and the second charge node;
a second capacitor connected between the second charge node and a second output node;
a sixth switch connected between the second output node and a ground;
a seventh switch connected between the second output node and an output terminal; and
an eighth switch connected between the second charge node and a ground,
wherein in the charge mode, the fifth switch and the sixth switch are configured to be in an ON state, and the seventh switch and the eighth switch are configured to be in an OFF state in response to the second clock signal, and
wherein in the discharge mode, the fifth switch and the sixth switch are configured to be in an OFF state, and the seventh switch and the eighth switch are configured to be in an ON state in response to the second clock signal.

22. The negative voltage generation circuit of claim 20, wherein the second charge pump circuit comprises:
the fifth switch connected between the second variable resistance circuit and the second charge node;
a second capacitor connected between the second charge node and a second output node;
a sixth switch connected between the second output node and a ground;
a seventh switch connected between the second output node and an output terminal; and
an eighth switch connected between the second charge node and a ground,
wherein in the charge mode, the fifth switch and the sixth switch are configured to be in an ON state, and the seventh switch and the eighth switch are configured to be in an OFF state in response the second clock signal, and wherein in the discharge mode, the fifth switch and the sixth switch are configured to be in an OFF state, and the seventh switch and the eighth switch are configured to be in an ON state in response to the second clock signal.

23. A negative voltage generation circuit comprising:

a clock generation circuit configured to generate a clock signal;

a voltage control circuit configured to vary a resistance value of the negative voltage generation circuit in proportion with a magnitude of a battery voltage of the negative voltage generation circuit; and a charge pump circuit configured to charge a voltage controlled by the voltage control circuit in a charging mode based on the clock signal and output a negative voltage in a discharging mode based on the clock signal.

* * * * *